(12) United States Patent
Urino

(10) Patent No.: US 10,749,601 B2
(45) Date of Patent: Aug. 18, 2020

(54) OPTICAL TRANSCEIVER

(71) Applicant: NEC Corporation, Minato-ku, Tokyo (JP)

(72) Inventor: Yutaka Urino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/661,632

(22) Filed: Mar. 18, 2015

(65) Prior Publication Data

US 2015/0280828 A1   Oct. 1, 2015

(30) Foreign Application Priority Data

Mar. 25, 2014   (JP) .................................. 2014-061156

(51) Int. Cl.
*H04B 10/40* (2013.01)
*H04B 10/67* (2013.01)
(Continued)

(52) U.S. Cl.
CPC ......... *H04B 10/40* (2013.01); *H04B 10/0795* (2013.01); *H04B 10/5053* (2013.01);
(Continued)

(58) Field of Classification Search
CPC ... H04B 10/40; H04B 10/0795; H04B 10/676
(Continued)

(56) References Cited

U.S. PATENT DOCUMENTS

| 4,959,826 A | * | 9/1990 | Smith | H04J 14/005 |
|---|---|---|---|---|
| | | | | 398/90 |
| 5,703,708 A | * | 12/1997 | Das | G02B 6/2861 |
| | | | | 250/227.12 |

(Continued)

FOREIGN PATENT DOCUMENTS

| JP | 2002-244090 A | 8/2002 |
|---|---|---|
| JP | 2002258228 A | 9/2002 |

(Continued)

OTHER PUBLICATIONS

Japanese Office Action for JP Application No. 2014-061156 dated Jan. 9, 2018 with English Translation.

(Continued)

*Primary Examiner* — Oommen Jacob

(57) ABSTRACT

An optical transceiver according to an exemplary aspect of the invention includes an interferometer including an input-side optical coupler, an output-side optical coupler, and two arms through which to propagate light and disposed between the input-side optical coupler and the output-side optical coupler, adding a bias phase difference of approximately $\pi/2+2n\pi$, n representing an integer, between light beams propagating through the two arms; an optical phase modulator generating an optical signal obtained by modulating a phase of continuous wave light to be inputted depending on an electrical signal to be inputted; and an optical delay device making a difference in time for which the optical signal modulated by the optical phase modulator reaching the output-side optical coupler, wherein the optical phase modulator operates by changing carrier density in a silicon optical waveguide.

3 Claims, 6 Drawing Sheets

(51) Int. Cl.
  *H04B 10/50* (2013.01)
  *H04B 10/079* (2013.01)
  *H04B 10/556* (2013.01)
  *H04L 7/00* (2006.01)

(52) U.S. Cl.
  CPC ....... *H04B 10/5561* (2013.01); *H04B 10/676* (2013.01); *H04L 7/0075* (2013.01)

(58) Field of Classification Search
  USPC .................................................. 398/25, 9, 1
  See application file for complete search history.

(56) References Cited

U.S. PATENT DOCUMENTS

| | | | | |
|---|---|---|---|---|
| 6,278,822 | B1* | 8/2001 | Dawnay | G02F 1/3133 385/132 |
| 6,819,475 | B2* | 11/2004 | Kawanishi | G02F 1/353 359/326 |
| 7,061,657 | B1* | 6/2006 | Fishman | H04J 14/002 398/74 |
| 7,546,041 | B2* | 6/2009 | Griffin | H04B 10/5561 398/188 |
| 7,973,688 | B2* | 7/2011 | Huang | G02F 7/00 341/118 |
| 2002/0003641 | A1* | 1/2002 | Hall | H04B 10/532 398/65 |
| 2002/0149826 | A1 | 10/2002 | Tanaka et al. | |
| 2003/0058519 | A1* | 3/2003 | Ibe | H04B 10/505 359/279 |
| 2003/0170035 | A1* | 9/2003 | Kisaka | H04J 14/08 398/183 |
| 2003/0174339 | A1* | 9/2003 | Feldchtein | G01B 9/02028 356/479 |
| 2004/0136647 | A1* | 7/2004 | Mizuno | G02B 6/12007 385/24 |
| 2004/0184819 | A1* | 9/2004 | Vassilieva | H04B 10/505 398/188 |
| 2004/0208642 | A1* | 10/2004 | Chen | H04B 10/505 398/186 |
| 2005/0238367 | A1* | 10/2005 | Chen | H04B 10/505 398/188 |
| 2006/0159466 | A1 | 7/2006 | Kim et al. | |
| 2006/0263098 | A1* | 11/2006 | Akiyama | G02F 1/0123 398/188 |
| 2007/0127933 | A1* | 6/2007 | Hoshida | H04B 10/66 398/202 |
| 2007/0248362 | A1* | 10/2007 | Tanaka | H04B 10/505 398/189 |
| 2009/0003755 | A1 | 1/2009 | Liu et al. | |
| 2009/0136241 | A1* | 5/2009 | Mo | H04B 10/505 398/188 |
| 2009/0251345 | A1* | 10/2009 | Huang | G02F 7/00 341/137 |
| 2010/0014862 | A1* | 1/2010 | Suzuki | H04B 10/5053 398/79 |
| 2010/0260504 | A1* | 10/2010 | Takahara | H04B 10/5053 398/152 |
| 2010/0329690 | A1* | 12/2010 | Shioiri | H04B 10/5053 398/115 |
| 2011/0091221 | A1* | 4/2011 | De Gabory | H04B 10/505 398/188 |
| 2012/0229886 | A1* | 9/2012 | Chen | H04B 10/506 359/326 |
| 2013/0272700 | A1 | 10/2013 | Satoh et al. | |
| 2013/0279847 | A1 | 10/2013 | Watanabe | |
| 2014/0099053 | A1 | 4/2014 | Sato et al. | |
| 2014/0118748 | A1* | 5/2014 | Rubio Guivernau | A61B 5/0066 356/479 |
| 2014/0185125 | A1* | 7/2014 | Kanter | G02F 1/21 359/279 |
| 2015/0280828 | A1* | 10/2015 | Urino | H04B 10/0795 398/25 |

FOREIGN PATENT DOCUMENTS

| | | |
|---|---|---|
| JP | 2004085602 A | 3/2004 |
| JP | 2006-203886 A | 8/2006 |
| JP | 2012063768 A | 3/2012 |
| JP | 2013-225762 A | 10/2013 |
| WO | 2011114753 A1 | 9/2011 |
| WO | 2012/077337 A1 | 6/2012 |
| WO | 2012/086846 A1 | 6/2012 |
| WO | 2012/165656 A1 | 12/2012 |

OTHER PUBLICATIONS

Japanese Office Action for JP Application No. 2014-061156 dated Aug. 21, 2018 with English Translation.

S. Akiyama, et al., "12.5-Gb/s operation with 0.29-Vcm VπL using silicon Mach-Zehnder modulator based-on forward-Diased pin diode," Optics Express, vol. 20, No. 3, pp. 2911-2923, 2012. USA.

* cited by examiner (a) PUSH-PULL DRIVING WITHOUT DELAY (b) WITH 0.25 BITS (8 PS) DELAY (c) WITH 0.5 BITS (16 PS) DELAY (d) WITH 1 BIT (32 PS) DELAY (e) WITH 1.25 BITS (40 PS) DELAY (f) WITH 1.5 BITS (48 PS) DELAY

OPTICAL TRANSCEIVER

This application is based upon and claims the benefit of priority from Japanese Patent Application No. 2014-061156, filed on Mar. 25, 2014, the disclosure of which is incorporated herein in its entirety by reference.

TECHNICAL FIELD

The present invention relates to an optical transceiver that performs signal conversion between electrical signals and optical signals in optical communication, optical interconnections, and the like.

BACKGROUND ART

Attention has been paid to optical modulators in which a PIN (P-intrinsic-N) junction or the like is formed in a silicon optical waveguide and the carrier density is changed to modulate the refractive index of the region. This is because the optical modulators have various advantages such as small size, low voltage driving, low cost, and easiness to be integrated with other optical elements and electronic circuits as compared with lithium-niobate optical modulators which have been used as optical modulators. It is known that this type of optical modulator can provide a high efficiency during forward biasing on the PIN junction but the efficiency decreases at 20 dB/decade in the frequency range higher than the cut-off frequency which is determined by the CR time constant. Non Patent Literature (S. Akiyama, et al., "12.5-Gb/s operation with 0.29-Vcm V$\pi$L using silicon Mach-Zehnder modulator based-on forward-biased pin diode," OPTICS EXPRESS, Vol. 20, No. 3, pp. 2911-2923, 2012) discloses a method for pre-emphasizing an input electrical signal with an FIR (Finite Impulse Response) filter beforehand in order to compensate for such frequency characteristics.

On the other hand, Japanese Patent Application Laid-open Publication No. 2012-063768 discloses an optical modulator capable of generating an optical de-emphasis signal.

Related techniques are described in Japanese Patent Application Laid-open Publication No. 2002-258228, Japanese Patent Application Laid-open Publication No. 2004-085602, and International Publication Number WO2011/114753.

SUMMARY

An exemplary object of the invention is to provide an optical transceiver that solves problems caused by using a silicon optical modulator.

An optical transceiver according to an exemplary aspect of the invention includes an interferometer including an input-side optical coupler, an output-side optical coupler, and two arms through which to propagate light and disposed between the input-side optical coupler and the output-side optical coupler, adding a bias phase difference of approximately $\pi/2+2n\pi$, n representing an integer, between light beams propagating through the two arms; an optical phase modulator generating an optical signal obtained by modulating a phase of continuous wave light to be inputted depending on an electrical signal to be inputted; and an optical delay device making a difference in time for which the optical signal modulated by the optical phase modulator reaching the output-side optical coupler, wherein the optical phase modulator operates by changing carrier density in a silicon optical waveguide.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
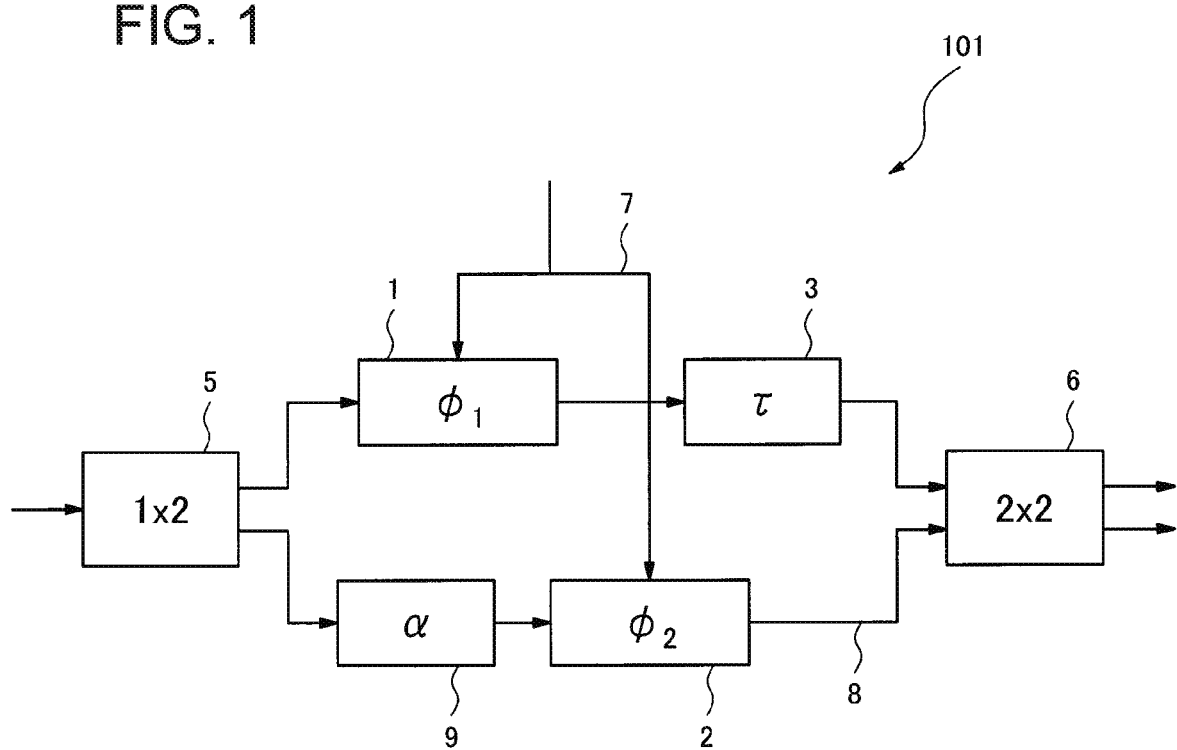
FIG. 1 is a block diagram schematically illustrating a circuit configuration of an optical transceiver in accordance with the first exemplary embodiment of the present invention.

An exemplary embodiment of the present invention will be described below with reference to FIG. 1. FIG. 1 is a block diagram schematically illustrating a circuit configuration of an optical transceiver in accordance with the first exemplary embodiment of the present invention.

An optical transceiver 101 of the present exemplary embodiment is a device which makes an optical signal whose phase is modulated by an input electrical signal interfere with an optical signal whose phase is modulated by an input electrical signal at a certain time before or after the input electrical signal, adding a bias phase difference of approximately $\pi/2$. The optical transceiver 101 includes at least an electrical wiring 7 to input the input electrical signal into a phase modulator, optical phase modulators 1, 2 generating phase-modulated optical signals, an optical delay device 3 providing a time difference between two optical signals to be made to interfere with each other, an optical attenuator 9 adjusting amplitudes of two optical signals to be made to interfere with each other, and two optical couplers 5, 6. These elements are interconnected by an optical waveguide 8 as illustrated in FIG. 1 and compose as a whole a Mach-Zehnder interferometer that makes two optical signals interfere with each other.

The continuous wave light inputted into the optical coupler 5 is split into two light beams. One of the light beams is inputted into the optical phase modulator 1. The other light beam is inputted into the optical attenuator 9, in which the amplitude is adjusted, and then inputted into the optical phase modulator 2. The optical phase modulators 1, 2 modulate the phases of the light beams inputted into the optical phase modulators respectively depending on the electrical signal inputted through the electrical wirings 7. The optical signal whose phase is modulated by the optical phase modulator 2 is inputted into the optical coupler 6. The optical signal whose phase is modulated by the optical phase modulator 1 is delayed by the optical delay device 3 by a predetermined amount of delay time and then inputted into the optical coupler 6. The optical coupler 6 is an optical coupler which makes the light beams interfere with each other adding a phase difference of $\pi/2+2n\pi$, n represents an integer, between a light beam inputted through a cross port and a light beam inputted through a bar port, and then outputs the resulting light beams.

It is desirable from the viewpoint of size reduction, high integration and cost reduction to form the optical transceiver 101 as described above by microfabrication of semiconductor materials and particularly it is preferable for the optical transceiver to be configured with a planar optical waveguide formed on a silicon substrate. However, it is known as shown in Non Patent Literature mentioned above that the efficiency of an optical phase modulator using a PN junction or a PIN junction of silicon decreases at −20 dB/decade in the frequency range higher than the cut-off frequency which is determined by the CR time constant. In the present exemplary embodiment, the delay time of the optical delay device 3 is set at the length of time corresponding to about 0.5 to 1.5 bits at the bit rate of the electrical signal inputted into the optical phase modulator 1 and the optical phase modulator 2, which enables an optical finite impulse response (FIR) filter to be composed. It is possible to compensate the frequency characteristic, that is, −20 dB/decade, of the above-described modulators using the frequency characteristics of the optical filter, and to generate a high-speed optical modulated signal.

Therefore, it is desirable to form the optical transceiver 101 on a semiconductor substrate and particularly it is preferable for the optical transceiver to be configured with a planar optical waveguide formed on a silicon substrate. It is preferable to use a silicon optical waveguide formed on a silicon substrate as the optical waveguide 8.

It is preferable to compose the optical phase modulator 1 and the optical phase modulator 2 by using a PN junction or a PIN junction formed on a silicon optical waveguide. Depending on a variation in voltage applied to the PN junction or the PIN junction, the carrier concentration in the junction is changed and the refractive index changes due to the carrier plasma effect, and consequently the phase of light beam passing through the junction is modulated.

As mentioned above, it is preferable for the optical delay device 3 to add a delay time corresponding to about 0.5 to 1.5 bits at the bit rate of the electrical signal applied to the optical phase modulator 1 and the optical phase modulator 2. For example, if the bit rate of the electrical signal is equal to 28 Gbps, its wavelength in a vacuum is approximately 1 cm. Therefore, if the effective refractive index of a silicon optical waveguide is equal to approximately 2, a silicon optical waveguide approximately 5 mm in length composes a 1-bit element of the optical delay device 3. It is possible to use a photonic crystal waveguide having a slow light effect, a ring resonator, an etalon resonator or the like as means for obtaining a similar delay time with a shorter optical waveguide.

The optical coupler 5 is an optical coupler in which light inputted through one input port is output in the same phase to two output ports, which is referred to as an in-phase optical coupler hereinafter. The other optical coupler 6 is an optical coupler which makes a light beam inputted through a cross port and a light beam inputted through a bar port interfere with each other adding a phase difference of $\pi/2$ between them and outputs them, which is referred to as a $\pi/2$ optical coupler hereinafter. This makes a bias phase difference of $\pi/2$ arise between two optical signals interfering with each other in the Mach-Zehnder interferometer.

It is described above that the optical coupler 5, which functions as an optical splitter, disposed at the input side of the Mach-Zehnder interferometer 11 is configured as an in-phase optical coupler and the optical coupler 6 disposed at the output side is configured as a $\pi/2$ optical coupler. However, it is also acceptable that the optical coupler 5, which functions as an optical splitter, disposed at the input side is configured as a $\pi/2$ optical coupler and the optical coupler 6 disposed at the output side is configured as an in-phase optical coupler. In this case, the optical coupler 5 is an optical coupler which adds a phase difference of $\pi/2$ between light output to the cross port and light output to the bar port and outputs them, and the optical coupler 6 is an optical coupler which makes light beams inputted through the two input ports interfere with each other in the same phase and outputs them.

In FIG. 1, the optical coupler 5, which functions as an optical splitter, disposed at the input side is configured by a 1×2 optical coupler and the optical coupler 6 disposed at the output side is configured by a 2×2 optical coupler. However, it is also acceptable that the optical coupler 5, which functions an optical splitter, disposed at the input side is configured by a 1×2 optical coupler and the optical coupler 6 disposed at the output side is configured by a 2×1 optical coupler. Alternatively, it is also acceptable that the optical coupler 5, which functions an optical splitter, disposed at the input side is configured by a 2×2 optical coupler and the optical coupler 6 disposed at the output side is configured by a 2×1 optical coupler. Alternatively, it is also acceptable that the optical coupler 5, which functions an optical splitter, disposed at the input side is configured by a 2×2 optical coupler and the optical coupler 6 disposed at the output side is configured by a 2×2 optical coupler.

There are a symmetrical Y splitter, a symmetrical star coupler, and a symmetrical 1×2 multimode interference (MMI) coupler and the like as examples of the in-phase optical coupler. The $\pi/2$ optical coupler includes a directional coupler and a symmetrical 2×2 MMI coupler. If the output-side optical coupler 6 is configured by a 2×2 coupler as illustrated in FIG. 1, it is also possible to perform optical differential transmission because differential signals are output at the two output ports.

It is desirable to install as the optical attenuator 9 an optical attenuator which has an optical loss nearly equal to the optical loss in the optical delay device 3 in order to make the amplitudes of light beams between two arms approximately equal to each other. However, if the loss in the optical delay device 3 is not so large, the optical attenuator 9 can be omitted. Alternatively, instead of installing the optical attenuator 9, it is also acceptable that the split ratio of the optical coupler 5 is made to be asymmetrical so that the optical amplitudes of the two arms may become approximately equal to each other when light beams in the two arms are made to interfere with each other in the optical coupler 6.

Next, an example of the operations of the optical transceiver of the present exemplary embodiment will be described. The optical output P of a symmetrical Mach-Zehnder interferometer can be generally expressed by formula (1).

$$P=\cos^2[(\phi 1-\phi 2+\phi 0)/2] \quad (1)$$

Here, $\phi 1$ and $\phi 2$ represent optical phase shift amounts generated by electrical signals inputted into the phase modulator 1 in arm 1 in which the optical delay device 3 is disposed in FIG. 1 and into the phase modulator 2 in arm 2 in which the optical attenuator 9 is disposed in FIG. 1 of the Mach-Zehnder interferometer, respectively, and $\phi 0$ represents a bias phase difference between arm 1 and arm 2.

In the first exemplary embodiment illustrated in FIG. 1, since the input-side optical coupler is configured by an in-phase optical coupler and the output-side optical coupler is configured by a $\pi/2$ optical coupler, $\phi 0=\pi/2$ is satisfied. It is assumed that the input electrical signal is a binary digital signal composed of 1 and 0.

It is assumed as a simplest example that the optical phase shift amount is 0 when the input electrical signal is 0 in both of the arms 1 and 2, and the optical phase shift amount is $\pi/2$ (radians) when the input electrical signal in both of the arms 1 and 2 is 1. The delay time in the optical delay device 3 is assumed to be a time corresponding to approximately 1 bit of the input electrical signal. In this case, when light beams from the two arms interfere with each other in the output-side optical coupler 6, the optical signal through the arm 1 interferes approximately 1 bit delayed relative to the optical signal through the arm 2. Table 1 shows outputs of the Mach-Zehnder interferometer calculated by formula (1) for this example.

When two consecutive bits of the input electrical signal are 0→0 or 1→1, that is, they do not change, the optical output becomes 0.5 of an intermediate value. When two consecutive bits are 0→1, the optical output becomes 1 of the maximum value. When two consecutive bits are 1→0, the optical output becomes 0 of the minimum value. The relationship between input and output is called differential characteristics by which it is possible to realize frequency response characteristics of +20 dB/dec that compensate the frequency response characteristics of −20 dB/dec which are electrical characteristics of PN junctions or PIN junctions.

TABLE 1

RELATIONSHIP BETWEEN INPUT ELECTRICAL SIGNAL AND OUTPUT OPTICAL SIGNAL

| ARM 1 INPUT ELECTRICAL SIGNAL (1-BIT DELAY) | ARM 2 INPUT ELECTRICAL SIGNAL | ARM 1 OPTICAL PHASE SHIFT AMOUNT (RAD) | ARM 2 OPTICAL PHASE SHIFT AMOUNT (RAD) | BIAS PHASE DIFFERENCE BETWEEN ARMS (RAD) | OUTPUT OPTICAL SIGNAL |
|---|---|---|---|---|---|
| 0 | 0 | 0 | 0 | $\pi/2$ | 0.5 |
| 0 | 1 | 0 | $\pi/2$ | $\pi/2$ | 1.0 |
| 1 | 0 | $\pi/2$ | 0 | $\pi/2$ | 0.0 |
| 1 | 1 | $\pi/2$ | $\pi/2$ | $\pi/2$ | 0.5 |

More generally, it is assumed that the optical phase shift amount is $\phi 10$ (radians) when the input electrical signal in the arm 1 is 0, the optical phase shift amount is $\phi 11$ (radians) when the input electrical signal in the arm 1 is 1, the optical phase shift amount is $\phi 20$ (radians) when the input electrical signal in the arm 2 is 0, and the optical phase shift amount is $\phi 21$ (radians) when the input electrical signal in the arm 2 is 1. The delay time in the optical delay device 3 is assumed to be a time corresponding to approximately 1 bit of the input electrical signal. Table 2 shows outputs of the Mach-Zehnder interferometer calculated by formula (1) in this example.

TABLE 2

RELATIONSHIP BETWEEN INPUT ELECTRICAL SIGNAL AND OUTPUT OPTICAL SIGNAL

| ARM 1 INPUT ELECTRICAL SIGNAL (1-BIT DELAY) | ARM 2 INPUT ELECTRICAL SIGNAL | ARM 1 OPTICAL PHASE SHIFT AMOUNT (RAD) | ARM 2 OPTICAL PHASE SHIFT AMOUNT (RAD) | BIAS PHASE DIFFERENCE BETWEEN ARMS (RAD) | OUTPUT OPTICAL SIGNAL |
|---|---|---|---|---|---|
| 0 | 0 | $\phi 10$ | $\phi 20$ | $\pi/2$ | $[1 - \sin(\phi 10 - \phi 20)]/2$ |
| 0 | 1 | $\phi 10$ | $\phi 21$ | $\pi/2$ | $[1 - \sin(\phi 10 - \phi 21)]/2$ |
| 1 | 0 | $\phi 11$ | $\phi 20$ | $\pi/2$ | $[1 - \sin(\phi 11 - \phi 20)]/2$ |
| 1 | 1 | $\phi 11$ | $\phi 21$ | $\pi/2$ | $[1 - \sin(\phi 11 - \phi 21)]/2$ |

The optical outputs shown in Table 2 become four values that are symmetric with respect to 0.5 if the condition of formula (2) is satisfied. Because the frequency response characteristics become a frequency response with +20 dB/decade in a frequency range higher than a certain frequency, it is possible to compensate the electrical characteristics of the PN junction or the PIN junction more finely.

$$\phi 10 - \phi 20 = \phi 21 - \phi 11 \qquad (2)$$

Next, a preferable delay time in the optical delay device 3 of the present exemplary embodiment will be described. FIGS. 2A to 2F illustrate eye patterns of optical outputs of the Mach-Zehnder interferometer with a different delay time of the optical delay device 3. The results are calculated under the condition that the bit rate of the input electrical signal is equal to 28 Gbps and the 3-dB cut-off frequency of the optical phase modulators 1 and 2 is equal to 160 MHz.

Figure 2A:
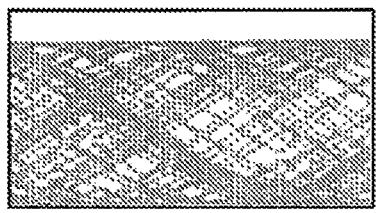
FIG. 2A is a characteristic diagram illustrating an eye pattern of optical outputs from a Mach-Zehnder interferometer without delay time of an optical delay device in an exemplary embodiment of the present invention.
Figure 2B:
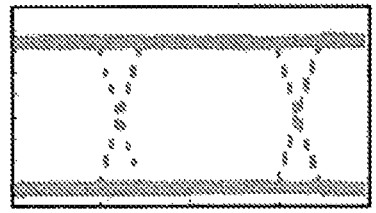
FIG. 2B is a characteristic diagram illustrating an eye pattern of optical outputs from the Mach-Zehnder interferometer with delay time of the optical delay device in an exemplary embodiment of the present invention.
Figure 2C:
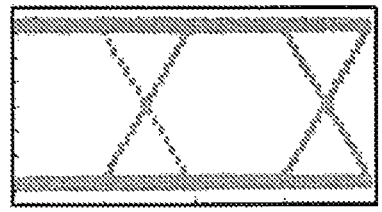
FIG. 2C is a characteristic diagram illustrating an eye pattern of optical outputs from the Mach-Zehnder interferometer with a different delay time of the optical delay device in an exemplary embodiment of the present invention.
Figure 2D:
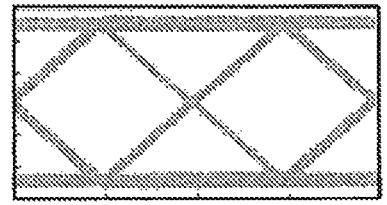
FIG. 2D is a characteristic diagram illustrating an eye pattern of optical outputs from the Mach-Zehnder interferometer with a different delay time of the optical delay device in an exemplary embodiment of the present invention.
Figure 2E:
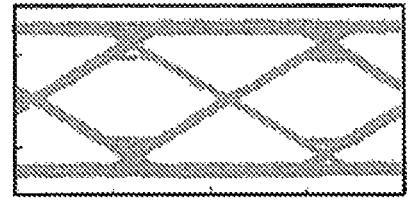
FIG. 2E is a characteristic diagram illustrating an eye pattern of optical outputs from the Mach-Zehnder interferometer with a different delay time of the optical delay device in an exemplary embodiment of the present invention.
Figure 2F:
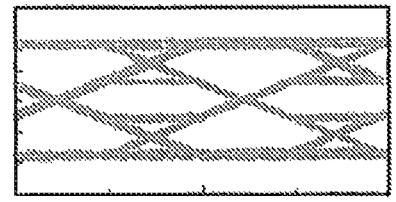
FIG. 2F is a characteristic diagram illustrating an eye pattern of optical outputs from the Mach-Zehnder interferometer with a different delay time of the optical delay device in an exemplary embodiment of the present invention.

FIG. 2A illustrates an eye pattern for the case of the conventional push-pull driving without a delay for comparison. It can be seen from FIG. 2A that the eye pattern is not open due to low-speed operations of the optical phase modulators 1 and 2. On the other hand, FIGS. 2B to 2F illustrate eye patterns when the delay time in the optical delay device 3 is varied from 0.25 bits (approximately 8 picoseconds) to 1.5 bits (approximately 48 picoseconds) respectively according to the above-mentioned method of the present exemplary embodiment. It can be seen that the eye opening is narrow when the delay time is equal to or more than 1.5 bits. Although the eye opening relative to the amplitude tends to enlarge as the delay time becomes shorter, the amplitude of the optical output also becomes smaller. Therefore it is preferable that the delay time in the optical delay device 3 should be from approximately 0.5 to 1.5 bits.

Figure 3:
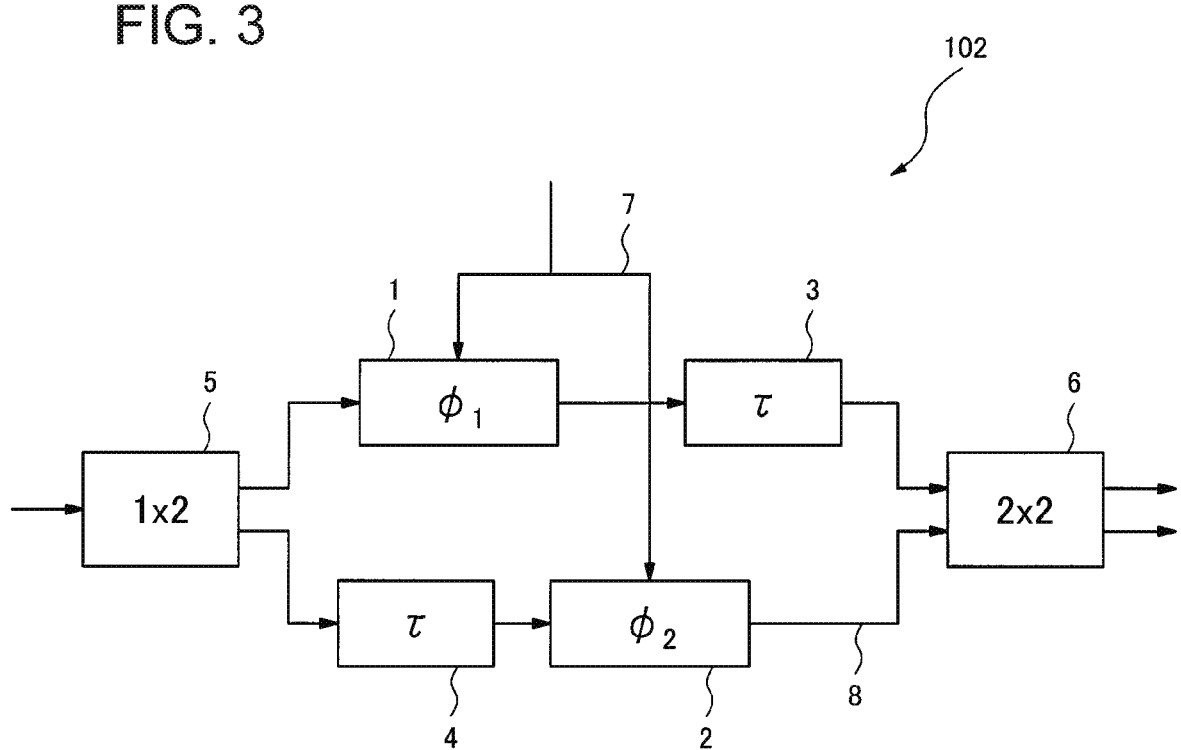
FIG. 3 is a block diagram schematically illustrating a circuit configuration of an optical transceiver in accordance with the second exemplary embodiment of the present invention.

Next, the second exemplary embodiment of the present invention will be described below with reference to FIG. 3. FIG. 3 is a block diagram schematically illustrating a circuit configuration of an optical transceiver in accordance with the second exemplary embodiment of the present invention.

The optical transceiver 102 of the present exemplary embodiment is configured to replace the optical attenuator 9 disposed in the arm 2 of the Mach-Zehnder interferometer in the first exemplary embodiment of the present invention with an optical delay device 4. That is to say, in the arm 1 of a Mach-Zehnder interferometer in the present exemplary embodiment, the optical delay device 3 is disposed between the optical phase modulator 1 and the output-side optical coupler 6, and the optical delay device 4 is disposed between the optical phase modulator 2 and the input-side optical coupler 5 in the arm 2.

The light inputted into the optical coupler 5 is split into two light beams. One of the light beams is inputted into the optical phase modulator 1. The other is inputted into the optical delay device 4, and inputted into the optical phase modulator 2 after a predetermined delay time has passed. The optical phase modulators 1, 2 modulate the phase of the light beam inputted into each of them depending on the electrical signal inputted through the electrical wirings 7. The optical signal whose phase is modulated by the optical phase modulator 2 is inputted into the optical coupler 6. The optical signal whose phase is modulated by the optical phase modulator 1 is delayed by the optical delay device 3 by a predetermined amount of delay time and then inputted into the optical coupler 6. The optical coupler 6 makes the light beam inputted through a cross port and the light beam inputted through a bar port interfere with each other adding a phase difference of π/2 between them, and outputs the resulting light beams.

The operation in the second exemplary embodiment is almost the same as that in the first exemplary embodiment as to the optical output with respect to the input electrical signal. The second exemplary embodiment differs from the first exemplary embodiment in the following respect. In the first exemplary embodiment, the same two continuous wave light beams split by the input-side optical coupler 5 are modulated using the same input electrical signal if a delay in the optical attenuator 9 in the first exemplary embodiment is neglected. On the other hand, in the second exemplary embodiment, one of the continuous wave light beams split by the input-side optical coupler 5 is delayed by the optical delay device 4 and then is modulated by the optical phase modulator 2 using the same electrical signal. This respect differs between those exemplary embodiments. However, the difference basically does not affect the operation to compensate the frequency response characteristics of the modulator described in the first exemplary embodiment. What affects the operation for compensation is only the delay time after modulation with the input electrical signal. That it is limited by a word of "basically" means that the difference does not affect the operation provided that the temperature and the wavelength of the light are constant.

Since the two arms have different optical path lengths in the first exemplary embodiment, the operating point is moved if the temperature or the wavelength of light varies. However, since the two arms have the same optical path length in the second exemplary embodiment, it has an advantage that the operating point is not moved even if the temperature or the wavelength of light varies.

The operation of the optical transceiver 102 in the second exemplary embodiment is almost the same as that of the first exemplary embodiment. However, since the same components are disposed in both arms, it becomes easy to equalize the optical loss and the optical path length in the two arms. Consequently, compared to the first exemplary embodiment, the second exemplary embodiment is characterized by the facts that it becomes easy to increase the extinction ratio of the optical output from the Mach-Zehnder interferometer and that it is possible to reduce the wavelength dependence and the temperature dependence of the optical output.

In general, the temperature coefficient of refractive index of semiconductors is greater than those of dielectrics such as lithium niobate and glass. Accordingly, the configuration in the present exemplary embodiment is significantly useful for stable operation over a wide range of temperature as compared with the configuration in the first exemplary embodiment in which the Mach-Zehnder interferometer is made of semiconductor such as silicon.

Figure 4:
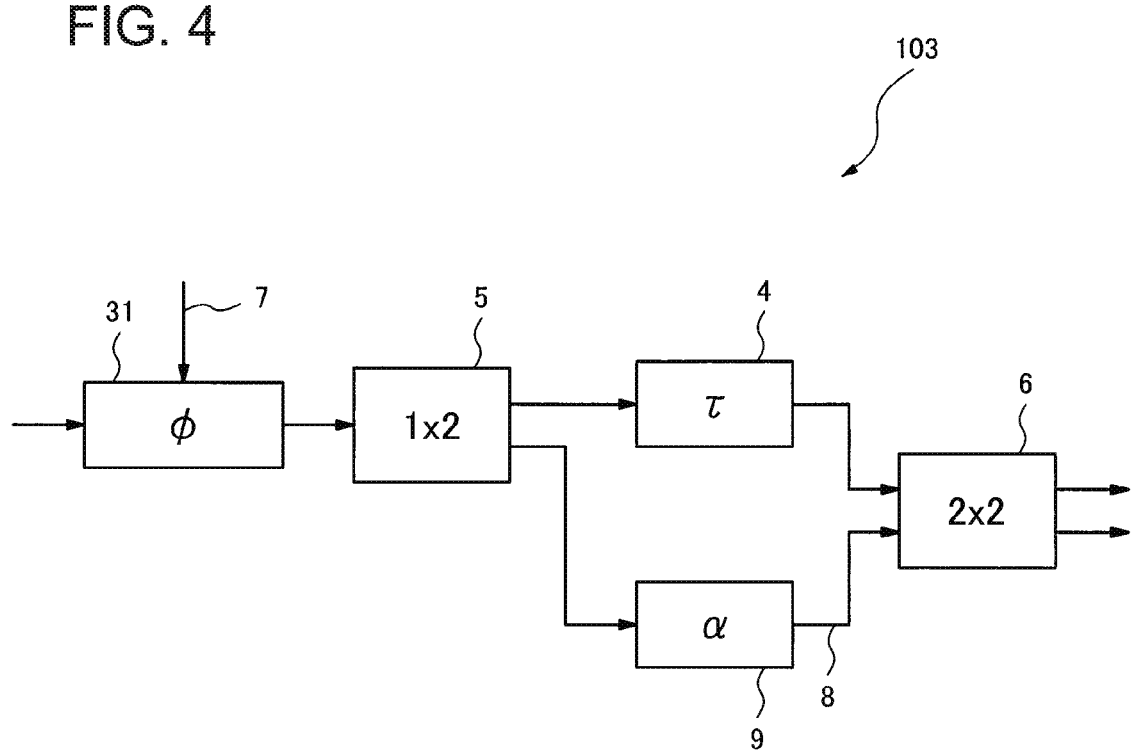
FIG. 4 is a block diagram schematically illustrating a circuit configuration of an optical transceiver in accordance with the third exemplary embodiment of the present invention.

Next, the third exemplary embodiment of the present invention will be described with reference to FIG. 4. FIG. 4 is a block diagram schematically illustrating a circuit configuration of an optical transceiver in accordance with the third exemplary embodiment of the present invention.

The optical transceiver 103 of the present exemplary embodiment is configured to dispose an optical phase modulator 31, into which the optical phase modulator 1 and the optical phase modulator 2 in the first exemplary embodiment illustrated in FIG. 1 are integrated, in a stage preceding the input-side optical coupler 5 of the Mach-Zehnder interferometer.

The optical phase modulator 31 modulates the phase of input continuous wave light depending on the electrical signal inputted through the electrical wiring 7 and outputs the resulting light to the optical coupler 5. The optical signal inputted into the optical coupler 5 is split into two optical signals. One of the optical signals is inputted into the optical delay device 4 and then inputted into the optical coupler 6 after a predetermined delay time has passed. The other optical signal is inputted into the optical attenuator 9 in which the amplitude of the optical signal is adjusted, and then is inputted into the optical coupler 6. The optical coupler 6 makes the light beams interfere with each other adding a phase difference of π/2 between a light beam inputted through a cross port and a light beam inputted through a bar port and outputs the resulting light beams.

The operation in the present exemplary embodiment is almost the same as that in the first exemplary embodiment. However, since only a single optical phase modulator is needed, the present exemplary embodiment is characterized by the fact that it is possible to reduce the size compared to the first exemplary embodiment.

Figure 5:
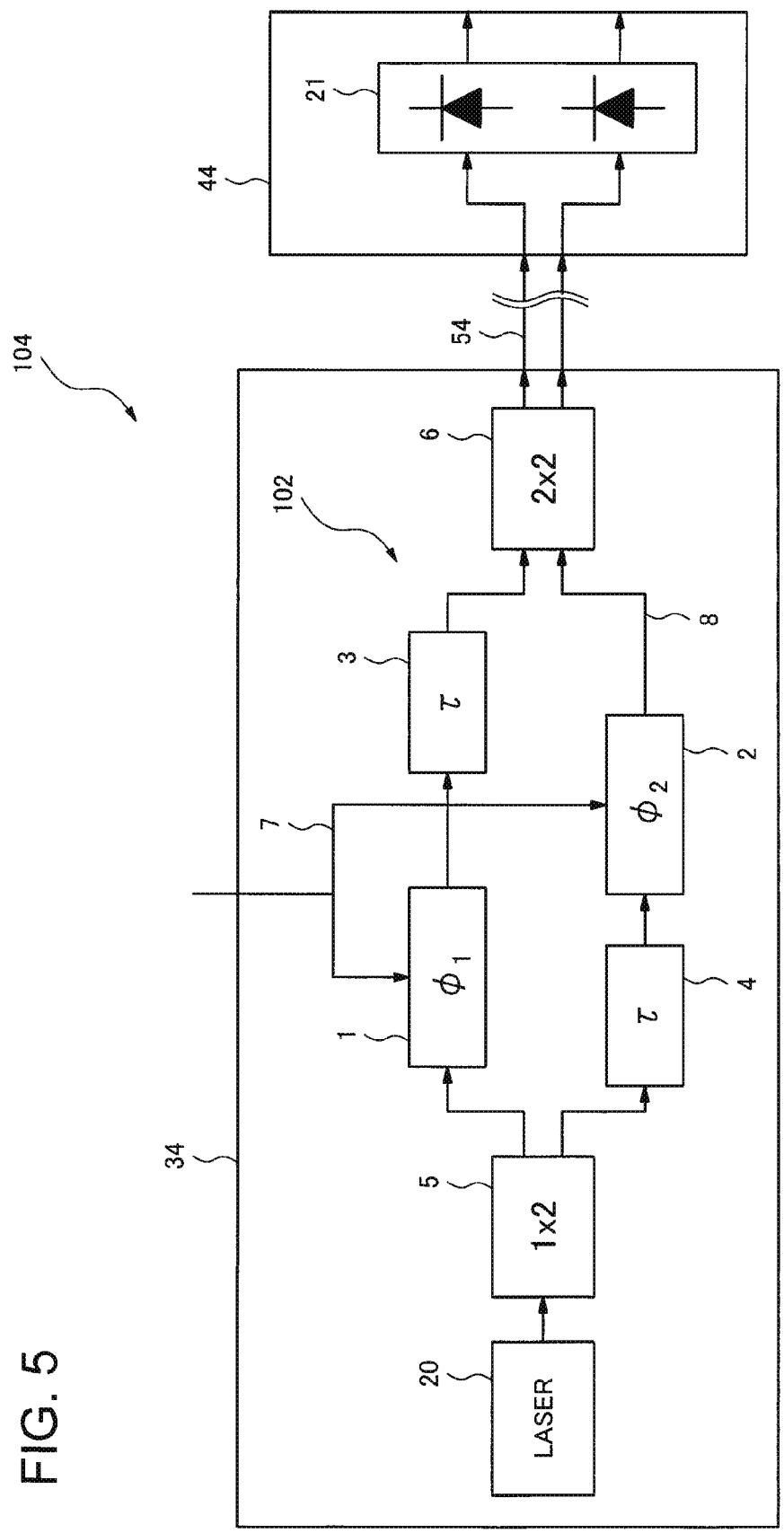
FIG. 5 is a block diagram schematically illustrating a circuit configuration of an optical transceiver in accordance with the fourth exemplary embodiment of the present invention.

Next, the fourth exemplary embodiment of the present invention will be described below with reference to FIG. 5. FIG. 5 is a block diagram schematically illustrating a circuit configuration of an optical transceiver in accordance with the fourth exemplary embodiment of the present invention.

The optical transceiver 104 of the present exemplary embodiment includes an optical transmitter 34, an optical receiver 44 configured by a balanced optical receiver 21 receiving optical differential signals, and optical waveguides 54 optically connecting the optical transmitter 34 to the optical receiver 44 to transmit the optical differential signals. The optical transmitter 34 is configured to connect optically a laser light source 20 generating continuous wave light to the input-side optical coupler 5 in the optical transceiver 102 described in the second exemplary embodiment of the present invention shown in FIG. 3.

As mentioned above, since differential signals are output at two output ports if the output-side optical coupler 6 is configured by a 2×2 optical coupler, it is possible to perform an optical differential transmission. Receiving the optical differential signals by the balanced optical receiver 21 enables to obtain a gain of approximately 3 dB. However, in order to perform the optical differential transmission efficiently, it is necessary to equalize the optical path lengths of two waveguides in the optical waveguide 54 with a precision of a length smaller than the wavelength of light. Therefore, the present exemplary embodiment is suitable for the case where the transmitter 34 and the receiver 44 are disposed on the same substrate.

Figure 6:
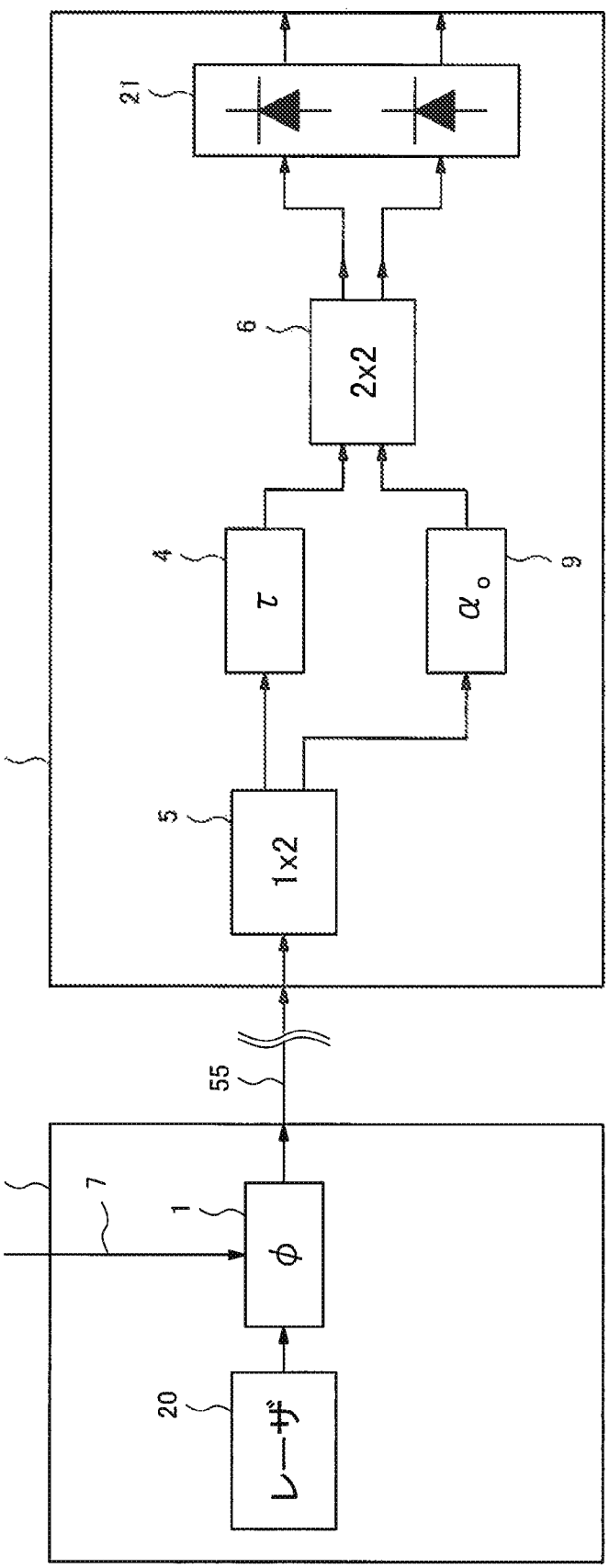
FIG. 6 is a block diagram schematically illustrating a circuit configuration of an optical transceiver in accordance with the fifth exemplary embodiment of the present invention.

Next, the fifth exemplary embodiment of the present invention will be described below with reference to FIG. 6. FIG. 6 is a block diagram schematically illustrating a circuit configuration of an optical transceiver in accordance with the fifth exemplary embodiment of the present invention.

The optical transceiver 105 of the present exemplary embodiment includes an optical transmitter 35, an optical receiver 45, and an optical waveguide 55 optically connecting the optical transmitter 35 to the optical receiver 45. The optical transmitter 35 is configured to connect optically the laser light source 20 generating continuous wave light to the optical phase modulator 1 in the third exemplary embodiment of the present invention. The optical receiver 45 includes the balanced optical receiver 21 receiving optical differential signals and the Mach-Zehnder interferometer in the third exemplary embodiment of the present invention which are composed of the optical coupler 5, the optical delay device 4, the optical attenuator 9, and the optical coupler 6.

As mentioned above, since differential signals are output at two output ports if the output-side optical coupler 6 is configured by a 2×2 optical coupler, it is possible to perform an optical differential transmission. Receiving the optical differential signals by the balanced optical receiver 21 enables to obtain a gain of approximately 3 dB. Since only one optical waveguide 55 is needed to optically connect the transmitter 35 to the receiver 45 in the present exemplary embodiment, it is unnecessary to equalize the optical path length unlike in the fourth exemplary embodiment. Therefore, the present exemplary embodiment is also suitable for the case where the distance between the transmitter 35 and the receiver 45 is longer, as compared with the fourth exemplary embodiment.

The present invention is not limited to these exemplary embodiments, and various changes may be made without departing from the spirit of the present invention. For example, although the Mach-Zehnder interferometer is used in above description as an interferometer interfering between two arms, it is also acceptable to substitute a Michelson interferometer for it. While the optical attenuator 9 is used in one arm in order to adjust the optical amplitudes between two arms of the Mach-Zehnder interferometer, an optical amplifier can be disposed in the other arm instead.

The method in the non patent literature mentioned above has problems that it is difficult to control the amplitude ratio and the delay time of inputted electrical signals with a high degree of accuracy up to a high frequency region if the FIR filter is implemented by an analog circuit, and that the circuit becomes larger and more expensive. If the FIR filter is implemented by a digital circuit, there are problems that it is difficult to control the amplitude ratio to achieve a deep emphasis with a high degree of accuracy, and that it is difficult to realize a delay time corresponding to non-integer bits.

The technique descried in Japanese Patent Application Laid-open Publication No. 2012-063768 mentioned above has a problem that there is a constraint between the length of a phase modulator and the length of an optical waveguide to transmit an optical signal whose phase is modulated by the phase modulator. In addition, there is another problem that an adjuster is required for adjusting the phase and the amplitude between data streams by which two phase modulators are phase-modulated.

An exemplary advantage according to the invention is that it is unnecessary for the optical transceiver of the present invention to control the amplitude ratio and the delay time of inputted electrical signals having high frequency with a high degree of accuracy, which has been a problem in above-mentioned non-patent literature, and that the circuit becomes smaller and less expensive. It also becomes possible to achieve a deep emphasis and realize a delay time corresponding to non-integer bits.

The optical transceiver of the present invention can solve the problem, which has been a problem in Japanese Patent Application Laid-open Publication No. 2012-063768 mentioned above, that there is a constraint between the length of a phase modulator and the length of an optical waveguide to transmit an optical signal whose phase is modulated by the phase modulator. Therefore, an adjuster is not required for adjusting the phase and the amplitude between data streams by which two phase modulators are phase-modulated.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

The invention claimed is:

1. An optical transceiver, comprising:
an interferometer comprising an input-side optical coupler, an output-side optical coupler, and two arms through which to propagate light and disposed between the input-side optical coupler and the output-side optical coupler, adding a bias phase difference of approximately $\pi/2+2n\pi$, n representing an integer, between light beams propagating through the two arms;
an optical phase modulator generating an optical signal obtained by modulating a phase of continuous wave light to be inputted depending on an electrical signal to be inputted; and
an optical delay device, located in a stage following the optical phase modulator, configured to add a delay time to the optical signal modulated by the optical phase modulator,
wherein the optical phase modulator operates by changing carrier density in a first silicon optical waveguide,
and wherein the optical delay device includes a second silicon optical waveguide, and the second silicon optical waveguide is of sufficient length to add a delay time corresponding to about 0.5 to 1.5 bits at a bit rate of the electrical signal to the optical signal,
and wherein the optical delay device is disposed in one arm of the two arms included in the interferometer, and constitutes an optical finite impulse response filter,
and wherein the optical phase modulator includes one of a PN junction and a PIN junction each of which is formed on the first silicon optical waveguide.

2. The optical transceiver according to claim 1,
wherein one of the input-side optical coupler and the output-side optical coupler is any one of a 1×2 optical coupler and a 2×2 optical coupler in which light inputted through one input port is output to two output ports in the same phase; and
the other of the input-side optical coupler and the output-side optical coupler is any one of a 1×2 optical coupler and a 2×2 optical coupler which makes a phase difference of $\pi/2$ between light output to a cross port and light output to a bar port.

3. The optical transceiver according to claim 1, further comprising
a first optical phase modulator as the optical phase modulator disposed in one of the two arms; and
a second optical phase modulator as the optical phase modulator disposed in the other of the two arms;
wherein a relationship is satisfied that $\phi 10-\phi 20$ is approximately equal to $\phi 21-\phi 11$,
where $\phi 10$ represents an optical phase shift amount when an electrical signal 0 is inputted into the first optical phase modulator, $\phi 11$ represents an optical phase shift amount when an electrical signal 1 is inputted into the first optical phase modulator, $\phi 20$ represents an optical phase shift amount when an electrical signal 0 is inputted into the second optical phase modulator, and $\phi 21$ represents an optical phase shift amount when an electrical signal 1 is inputted into the second optical phase modulator.

* * * * *